(12) United States Patent
Bunker

(10) Patent No.: US 6,179,556 B1
(45) Date of Patent: *Jan. 30, 2001

(54) TURBINE BLADE TIP WITH OFFSET SQUEALER

(75) Inventor: Ronald Scott Bunker, Niskayuna, NY (US)

(73) Assignee: General Electric Company, Schenectady, NY (US)

(*) Notice: Under 35 U.S.C. 154(b), the term of this patent shall be extended for 0 days.

This patent is subject to a terminal disclaimer.

(21) Appl. No.: 09/323,375

(22) Filed: Jun. 1, 1999

(51) Int. Cl.$^7$ .................................................. B63H 3/00
(52) U.S. Cl. .................... 415/115; 416/97 R; 416/236 A
(58) Field of Search .................... 416/92, 97 R, 416/96 A, 236 A, 228, 235; 415/115, 116, 173.1, 173.2, 173.5

(56) References Cited

U.S. PATENT DOCUMENTS

| | | |
|---|---|---|
| 3,575,523 | 4/1971 | Gross, Jr. .............................. 415/172 |
| 4,130,373 | 12/1978 | Giles ........................................ 415/1 |
| 4,142,824 | 3/1979 | Anderson . |
| 4,161,318 | 7/1979 | Stuart et al. .......................... 277/53 |
| 4,390,320 | 6/1983 | Eiswerth ............................ 416/97 R |
| 4,753,575 | 6/1988 | Levengood et al. ............... 416/97 R |
| 4,893,987 | 1/1990 | Lee et al. .............................. 416/92 |
| 5,232,343 * | 8/1993 | Butts .................................... 415/115 |
| 5,261,789 | 11/1993 | Butts et al. ......................... 416/96 R |
| 5,348,446 * | 9/1994 | Lee et al. . |
| 5,403,158 | 4/1995 | Auxier ............................... 416/97 R |
| 5,476,364 | 12/1995 | Kildea .................................... 416/95 |
| 5,482,435 | 1/1996 | Dorris et al. ....................... 416/97 R |
| 5,660,523 | 8/1997 | Lee . |

FOREIGN PATENT DOCUMENTS 2155558A 9/1985 (GB) .
57052603 3/1982 (JP) .

OTHER PUBLICATIONS

D.E. Metzger et al., "Cavity Heat Transfer on a Transverse Grooved Wall in a Narrow Flow Channel", Mechanical & Aerospace Engineering Dept., Arizona State University, Tempe, AZ, Journal of Heat Transfer, Transaction of the ASME, Feb. 1989, vol. 111, pp. 73–79.

Y.W. Kim et al., "A Summary of the Cooled Turbine Blade Tip Heat Tranfer and Film Effectiveness Investigations Performed by Dr. D. E. Metzger", Presented at the International Gas Turbine & Aeroengine Congress & Exposition, The Hague, Netherlands, Transactions of the ASME, June 13–16, 1994.

Docket No. 13DV–10827 entitled "Tapered Tip Turbine Blade".

Docket No. 13DV–12871 entitled "Tapered Tip–Rib Turbine Blade".

* cited by examiner

Primary Examiner—Edward K. Look
Assistant Examiner—Hermes Rodriguez
(74) Attorney, Agent, or Firm—Patrick K. Patnode; Marvin Snyder

(57) ABSTRACT

An industrial turbine assembly comprises a plurality of rotating blade portions in a spaced relation with a stationary shroud. The rotating blade includes a root section, an airfoil having a pressure sidewall and a suction sidewall defining an outer periphery and a tip portion having a tip cap. An offset squealer is disposed on the tip cap. The offset squealer is positioned inward from the outer periphery of the rotating blade. The offset squealer increases the flow resistance and reduces the flow of hot gas flow leakage for a given pressure differential across the blade tip portion so as to improve overall turbine efficiency.

12 Claims, 4 Drawing Sheets

TURBINE BLADE TIP WITH OFFSET SQUEALER

This invention was made with government support under government contract number DEFC21-95-MC31176, awarded by the Department of Energy (DOE). The government may have certain rights to this invention.

BACKGROUND OF THE INVENTION

This application relates to turbine blades and in particular relates to improved turbine blade tip clearance characteristics.

Turbine engines include a compressor for compressing air that is mixed with fuel and ignited in a combustor for generating combustion gases. The combustion gases flow to a turbine such that thermal energy produced within the combustor is converted into mechanical energy within the turbine by impinging the hot combustion gases onto one, or alternatively, a series of bladed rotor assemblies.

The performance and efficiency of turbine engines are critically affected by the clearances that exist between the rotating and stationary components within the turbine. As the clearances increase between the bladed rotor assemblies and the stationary assemblies, such as shrouds, the efficiency of the turbine decreases.

Accordingly, it is desirable for a turbine designer to maintain the clearances, herein referred to as "clearance gaps," between the bladed rotor assemblies and the shroud at a minimum without interfering with the rotation of the rotor assembly or affecting the structural integrity of the rotor or shroud. Even with sophisticated clearance control methods, however, clearance gaps cannot be completely eliminated.

The clearance gaps between the tip of the rotor blades and the adjacent stationery shrouds provide a narrow flow passage between the pressure and suction sides of a blade, resulting in hot gas flow leakage that is detrimental to the blade aerodynamic performance. Although the resulting leakage flow is undesirable, the clearance gaps must accommodate for the overall growth of the blade during operation. The overall growth of the blade is a product of several growth components including thermal expansion of the rotor, which expansion results because the rotor is typically more difficult to cool than the shroud. This cooling difficulty arises because the rotor blade extends over a relatively large radial distance and involves the thermal expansion of many sections, whereas the shroud is a much more compact component.

As beforementioned, the primary detrimental effect of the tip leakage flow is on the blade aerodynamic performance but a second important and less well understood effect concerns the convection heat transfer associated with the leakage flow. Surface area at the blade tip in contact with the hot working gas represents an additional thermal loading on the blade which together with heat transfer to the suction and pressure side surface area must be removed by the blade internal cooling flows. The additional thermal loading imposes a thermodynamic penalty on engine performance and degrades overall turbine performance.

The resultant thermal loading at the blade tip can be very significant and detrimental to the tip durability, especially the blade tip region near the trailing edge, which region can be difficult to cool adequately with blade internal cooling flows. As a result, blade tips have traditionally been one of the turbine areas most susceptible to structural damage. Structural damage to the blade tips can have a severe effect on turbine performance. Loss of material from the tip increases the clearance gap, increases the leakage flow and heat transfer across the tip, and in general exacerbates all of the above problems.

Numerous conventional blade tip designs exist for maintaining the proper pressure and suction side flow surfaces of the blade at the tip cap as well as providing minimum clearances with the stator shroud. Numerous cooling configurations also exist for cooling the blade tip caps for obtaining useful lives of the blades without undesirable erosion. Since cooling of the blade, including the blade tip, typically uses a portion of the compressed air from the gas turbine compressor, that air is unavailable for combustion in the combustor of the engine which decreases the overall efficiency of the turbine engine. Accordingly, the cooling of the blade including the blade tip should be accomplished with as little compressed air as possible to minimize the loss in turbine efficiency. The turbine blade may, however, be steam cooled or the like and may be open-circuit or closed circuit cooling.

Therefore, it is apparent from the above that there exists a need in the art for improvements in turbine blade tip leakage flow characteristics.

SUMMARY OF THE INVENTION

An industrial turbine assembly comprises a plurality of rotating blade portions in a spaced relation with a stationary shroud. The rotating blade includes a root section, an airfoil having a pressure sidewall and a suction sidewall defining an outer periphery and a tip portion having a tip cap. An offset squealer is disposed on the tip cap. The offset squealer is positioned inward from the outer periphery of the rotating blade. The offset squealer increases the flow resistance and reduces the flow of hot gas flow leakage for a given pressure differential across the blade tip portion so as to improve overall turbine efficiency.

DETAILED DESCRIPTION OF THE INVENTION

Figure 1:
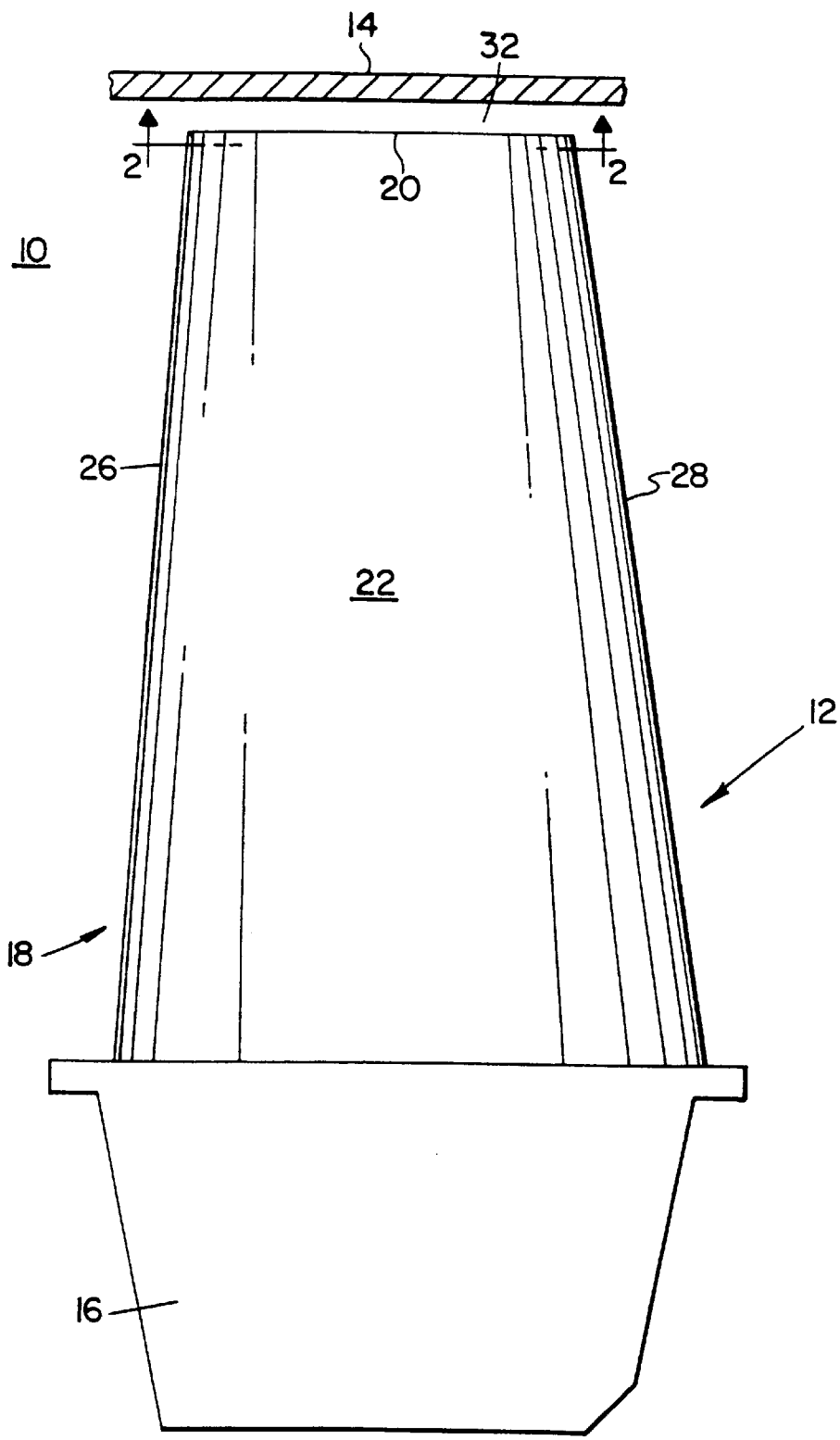
FIG. 1 is a schematic elevational view of a representative turbine blade.

A turbine assembly 10 comprises a plurality of rotor blade portions 12 and an outer shroud 14 concentrically disposed about rotor blade portion 12, as shown in FIG. 1. Rotor blade portion 12 comprises an inner root portion 16, an airfoil 18 and an outer tip portion 20. Although the present invention is described herein in connection with turbine assembly 10, the present invention is not limited to practice in turbine assembly 10. The present invention can be implemented and utilized in connection with many other configurations. Therefore, it should be understood that turbine assembly 10 is an exemplary assembly in which the present invention can be implemented and utilized.

Figure 2:
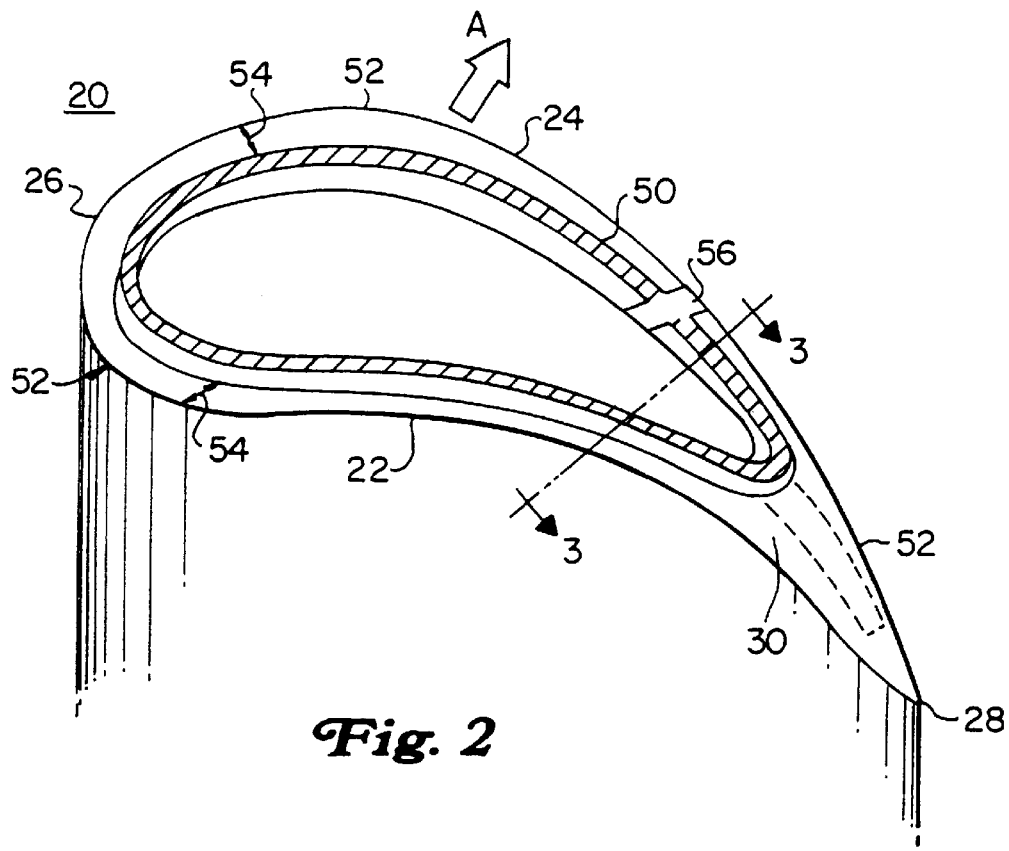
FIG. 2 is a top planar view of a tip section 2—2 of FIG. 1 in accordance with one embodiment of the instant invention.

Airfoil 18 extends outwardly into the working medium flow path of the turbine where working medium gases exert motive forces on the surfaces thereof. Airfoil 18 includes a pressure sidewall 22 and an opposite suction sidewall 24 (FIG. 2) joined together at a leading edge 26 (FIG. 1) and a trailing edge 28. Outer tip portion 20 comprises an outer tip cap 30, as shown in FIG. 2.

As best shown in FIG. 1, outer shroud 14 is spaced apart from tip section 20 so as to define a clearance gap 32 therebetween. As generally discussed in the above background section, the performance and efficiency of the turbine is critically affected by clearance gap 32. The greater the amount of leakage flow through clearance gap 32, the greater the inefficiency of the turbine, as the leakage flow is not exerting motive forces on the blade surfaces and accordingly is not providing work.

In accordance with one embodiment of the instant invention. FIG. 2 shows tip section 20 that is defined by pressure sidewall 22, suction sidewall 24, leading edge 26, trailing edge 28 and tip cap 30. The direction of the rotation of blade portion 12 (FIG. 1) is represented generally by arrow "A of FIG. 2.

An offset squealer 50 is disposed on tip cap 30. Offset squealer 50 protrudes into clearance gap 32 (FIG. 1) so as to discourage and divert leakage flow between tip section 20 and outer shroud 14 by creating flow resistance therebetween.

Offset squealer 50 (FIG. 2) enhances the flow resistance through clearance gap 32 (FIG. 1) and thus reduces the flow of hot gas leakage for a given pressure differential so as to improve overall turbine efficiency.

Figure 3:
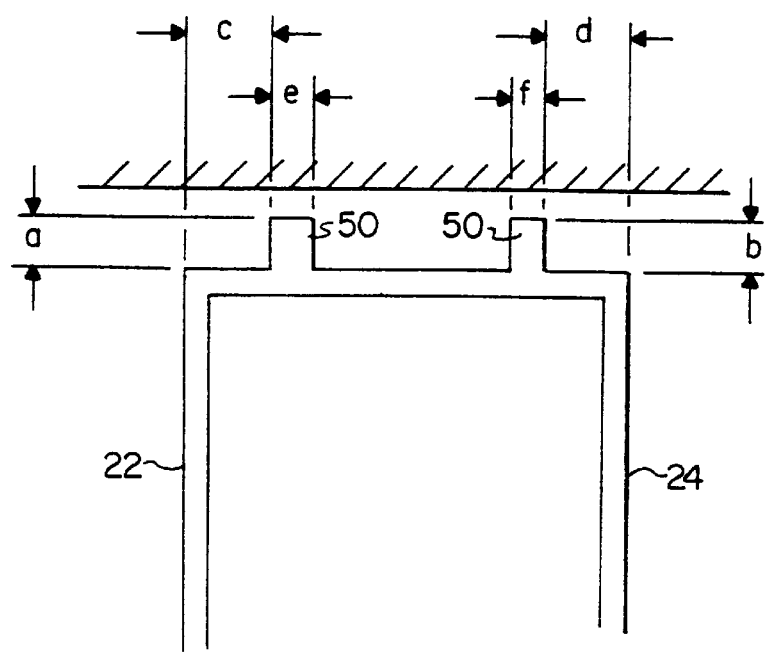
FIG. 3 is a partial cut away view of a turbine blade taken along section 3—3 of FIG. 2 in accordance with one embodiment of the instant invention.

As shown in FIG. 3, the width of offset squealer 50 (represented by "e" on the portion closest to pressure sidewall 22 and by "f" on the portion closest to suction sidewall 24) may be varied for best performance, typically depending upon the size of the overall turbine assembly. In one embodiment, width (e), (f) is in the range between about 0.02 inches to about 0.15 inches. In one embodiment, for example, for aircraft engine turbines, width (e), (f) is in the range between about 0.02 inches to about 0.05 inches and for industrial power turbines, width (e), (f) is in the range between about 0.05 inches to about 0.150 inches. Widths (e) and (f) are typically, although not necessarily, equal. Widths (e) and (f), however, could be varied around the perimeter of tip cap 30.

The height of offset squealer 50 (represented by "a" on the portion closest to pressure sidewall 22 and by "b" on the portion closest to suction sidewall 24) may be varied for best performance, typically depending on the size of the overall turbine assembly. In one embodiment, height (a), (b) is in the range between about 0.03 inches to about 0.3 inches, In one embodiment, for example, for aircraft engine turbines, height (a), (b) is in the range between about 0.03 inches to about 0.100 inches and for industrial power turbines, height (a), (b) is in the range between about 0.05 inches to about 0.3 inches. Heights (a) and (b) are typically, although not necessarily, equal. Heights (a) and (b), however, may be varied around the perimeter of tip cap 30.

Offset squealer 50 is positioned inward from an outer periphery 52 of blade tip 30. Offset squealer 50 forms a tip-shaped rim, fence or seal-strip that is offset to the interior of blade tip 30. The offset creates a step 54 or shelf around the entire perimeter of blade tip 30. Leakage flow that would normally travel circumferentially into tip gap 32 on the blade pressure side must flow over recessed step 54 that contains a separated flow region (low heat transfer region). Additionally, step 54 also serves as a flow resistance element.

The inward positioning of offset squealer 50 (represented by "c" on the portion closest to pressure sidewall 22 in FIG. 3 and by "d" on the portion closest to suction sidewall 24) may be varied for best performance, typically depending on the size of the overall turbine assembly. In one embodiment, inward positioning (c), (d) is in the range between about 0.05 inches to about 0.5 inches. In one embodiment, for example, for aircraft engine turbines, inward positioning (c), (d) is in the range between about 0.050 inches to about 0.150 inches, and for power turbines, inward positioning (c), (d) is in the range between about 0.05 inches to about 0.50 inches. Inward positionings (c) and (d) are typically, although not necessarily, equal. Inward positioning (c) and (d) may, however, be varied around the perimeter of tip cap 30.

Furthermore, flow exiting from suction side 24 must travel back over a back-facing step 54 that contains a separation region. The offsetting of offset squealer 50 from the periphery of tip cap 30 also serves to reduce the tip cavity width-to-depth ratio, thereby providing lower cavity floor heat transfer. Offset squealer may also comprise at least one slot 56 close to trailing edge 28 for the exiting of any tip cavity coolant flow. Slot 56 location as well as size and orientation can be varied as needed. The existence of the suction side separation step may also reduce the suction tip roll-up vortex in the mainstream flow.

Figure 4:
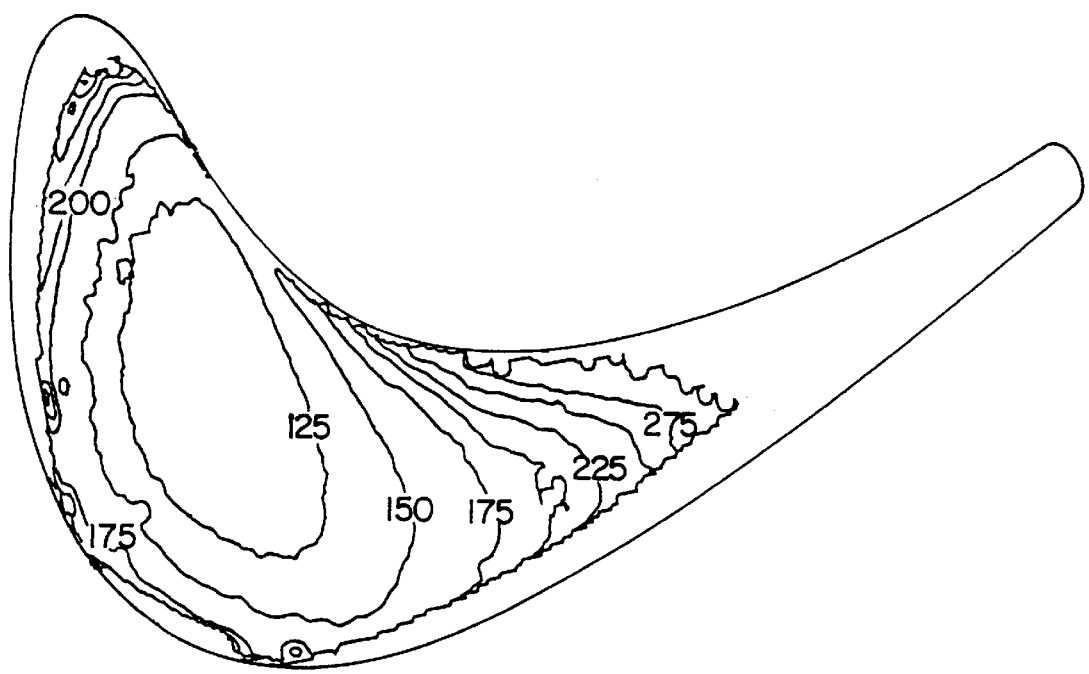
FIGS. 4–6 are drawings of laboratory cascade data depicting tip surface heat transfer coefficient distributions for a flat tip, a squealer tip, and an offset squealer in accordance with one embodiment of the invention in heat transfer units of Btu/hr/ft2/F.
Figure 5:
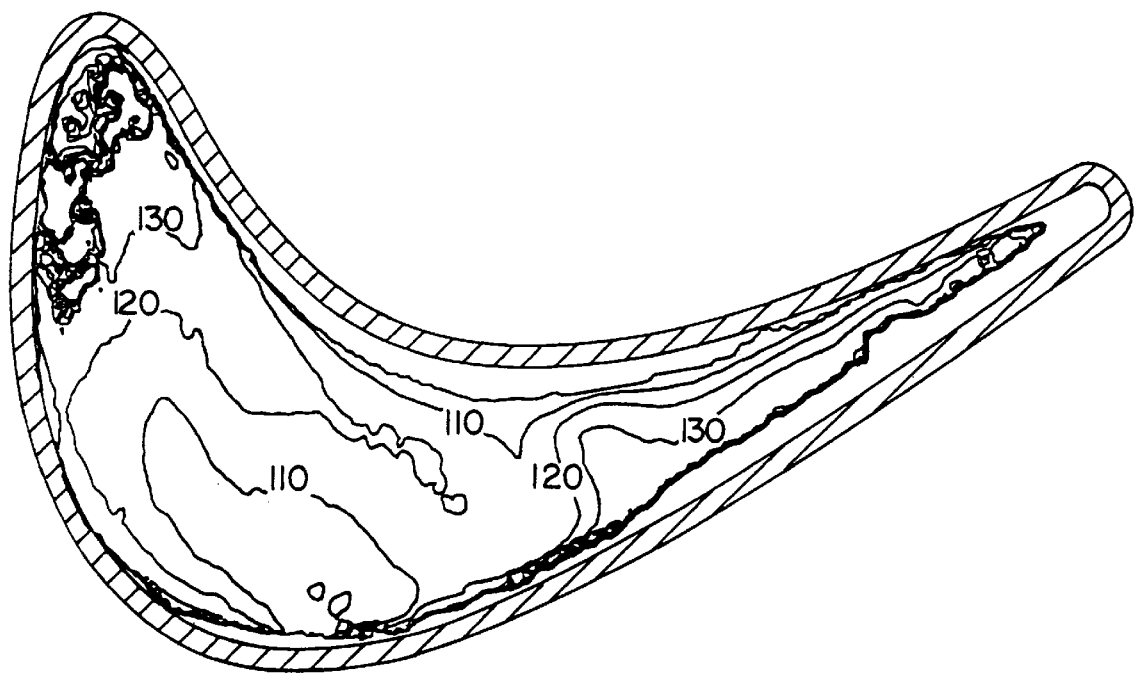
Figure 6:
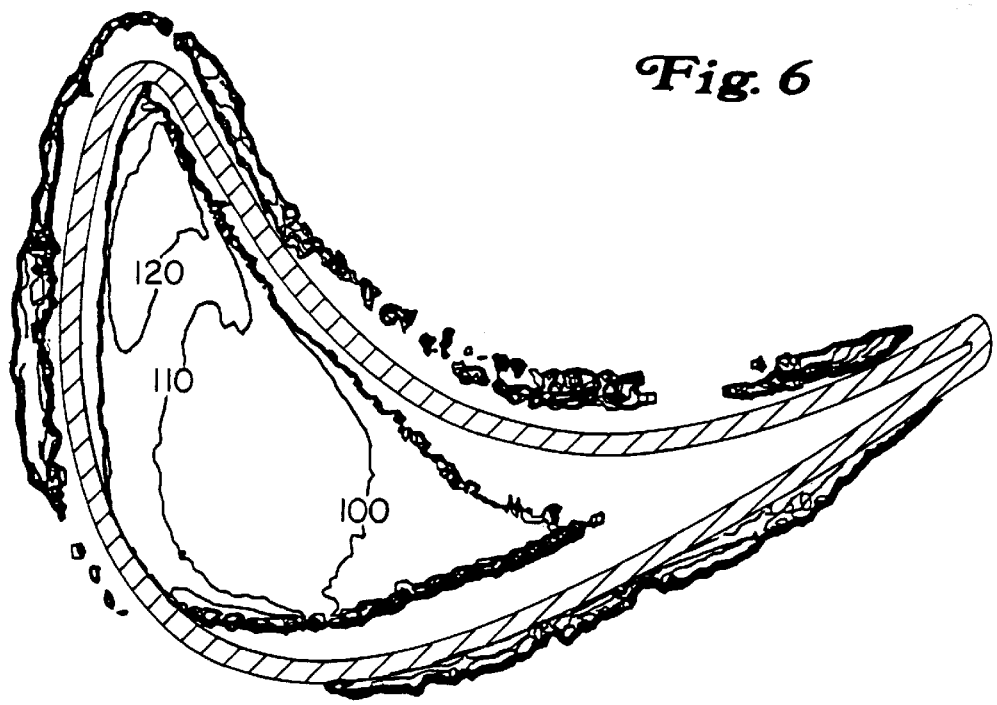
Figure 7:
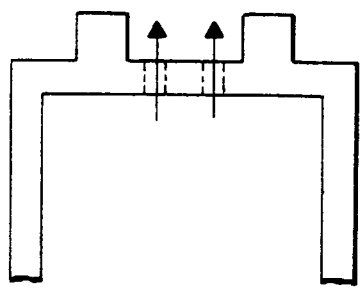
FIGS. 7–10 are alternative partial cut away views of a turbine blade taken along section 3—3 of FIG. 2 in accordance with alternative embodiments of the instant invention.
Figure 8:
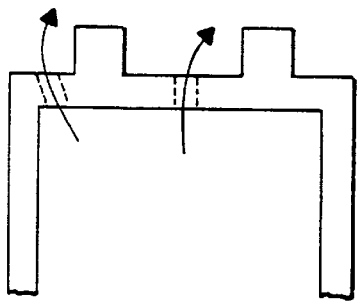

Offset squealer 50 is positioned over the more effectively internally-cooled region of the blade. Accordingly, offset squealer 50 is better cooled from below. FIGS. 4, 5, and 6 depict the convective heat transfer coefficient distributions for the external blade tips of three geometries as determined by a laboratory scale test (all coefficients are in units of Btu/hr/ft2/F). Each of these blade tip geometries was run under equivalent conditions of flow, temperature, and tip clearance, non-dimensionally equivalent to a typical turbine blade. These test models were not internally cooled.

FIG. 4 shows the heat transfer on a smooth, flat blade tip. Since this blade tip has no deliberate mechanism for the reduction of tip leakage flow, this test results in the highest heat load on the tip external surface.

FIG. 5 shows the heat transfer on a smooth blade tip with an added peripheral squealer rim, as indicated by the thick black outline. The heat transfer on this tip, inside the squealer rim perimeter, is considerably lower in magnitude than that of the nonsquealer case. The addition of the squealer rim serves to increase the resistance to leakage flow through the tip gap, and thereby reduce the heat load on the tip surface. The heat transfer on the surfaces of the squealer rim itself was not measured, but from other published literature data (eg. Metzger, D. E., Bunker, R. S., and Chyu, M. K., 1989, "Cavity Heat Transfer on a Transverse Grooved Wall in a Narrow Flow Channel", Journal of Heat Transfer, Vol. 111, pp. 73–79) these surfaces will experience as great or greater heat transfer levels than the blade tip surfaces within the squealer perimeter. Because this squealer rim is located on the periphery of the blade tip, it is to a great degree isolated from receiving any cooling benefit from the internal cooling passages of the blade.

FIG. 6 shows the heat transfer on a smooth blade tip with the present invention of the offset squealer rim, again as approximately indicated by the thick black outline. In this instance, the heat transfer magnitude within the perimeter of the offset squealer is even lower than that of the peripheral squealer, which will lead to even lower blade tip heat load. The heat transfer levels indicated in the regions outside the offset squealer are no worse than the highest levels within the offset squealer perimeter. In this case, since the offset squealer is not on the far periphery of the blade tip, it is instead located directly above the blade internal cooling passages. This location will provide an immense improvement to the cooling of the extended squealer rim, leading to a lower temperature and longer life. Additionally, due to the flow recirculation regions which will be formed by the offset squealer in the areas outside the rim perimeter, the heat transfer levels on the squealer rim surfaces are expected to also be lower than those on the peripheral squealer rim.

The present invention can be employed with any suitable manufacturing method. The offset squealer may be formed, for example, by integral casting with the blade tip or complete blade, by electron-beam welding of flow discouragers to a blade tip, by physical vapor deposition of material to a blade tip, or by brazing material. Alternately, a blade tip, which has been cast to oversized dimensions, may have material removed by various methods, for example laser ablation, thereby forming the offset squealer.

Figure 9:
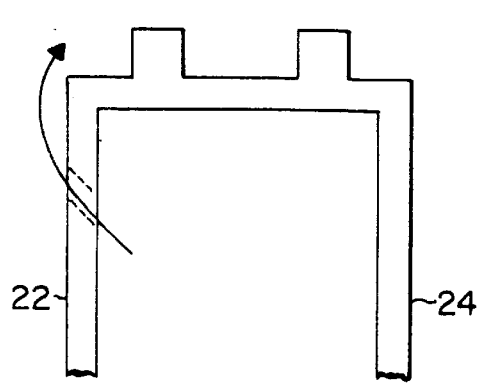
Figure 10:
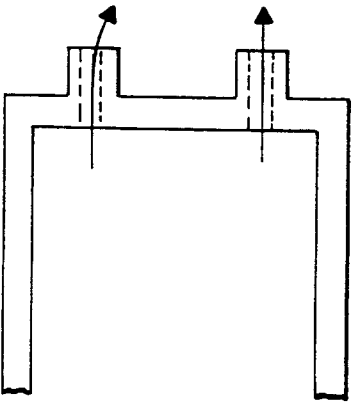

FIGS. 7 through 10 show alternate depictions of the use of tip cooling holes for the offset squealer of the present invention. In addition to internal cooling, it is common practice to divert a portion of cooling air to the exterior of the blade tip via holes in either the airfoil pressure side 22 or holes in the tip surfaces, or combinations of these. These cooling holes eject coolant that serves both to protect the surface from hot gases, and to provide additional fluid sealing to reduce tip hot gas leakage. Such coolant may be ejected through holes between the offset squealer rims (FIG. 7), or through these holes and holes in the peripheral region outside the offset squealer rim (FIG. 8), or through holes on the airfoil surfaces near the tip (FIG. 9). Also, cooling holes may be located through the offset squealer rims as in FIG. 10, as long as the hole diameters are less than the rim width. It should also be understood that cooling holes may be of various shape, size, location, and angles.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A turbine assembly comprising:
    at least one rotor blade comprising a root portion, an airfoil having a pressure sidewall and a suction sidewall defining an outer periphery and a tip portion having a tip cap;
    an outer shroud concentrically disposed about said at least one rotor blade, said shroud in combination with said tip portions defining a clearance gap therebetween; and
    an offset squealer disposed on said tip cap of said tip portion, wherein said offset squealer is positioned inward from said outer periphery of said at least one rotor blade to create a shelf around the entirely periphery of said blade so as to reduce hot gas flow leakage through said clearance gap.

2. A turbine assembly in accordance with claim 1, wherein the width of said offset squealer is in the range between about 0.02 inch to about 0.150 inch.

3. A turbine assembly, in accordance with claim 1, wherein said width is in the range between about 0.02 to about 0.05 inches.

4. A turbine assembly, in accordance with claim 1, wherein said width is in the range between about 0.05 to about 0.150 inches.

5. A turbine assembly in accordance with claim 1, wherein the height of said offset squealer is in the range between about 0.03 inch to about 0.3 inch.

6. A turbine assembly in accordance with claim 1, wherein said height is in the range between about 0.03 to about 0.100 inches.

7. A turbine assembly in accordance with claim 1, wherein said height is in the range between about 0.05 to about 0.3 inches.

8. A turbine assembly in accordance with claim 1, wherein the width and the height of said offset squealer is about equal.

9. A turbine assembly in accordance with claim 1, wherein said offset squealer is positioned between about 0.05 to about 0.5 inches inward from said outer periphery of said tip caps.

10. A turbine assembly in accordance with claim 1, wherein said offset squealer is positioned between about 0.050 to about 0.150 inches.

11. A turbine assembly in accordance with claim 1, further comprising a plurality of interspersed tip cooling holes.

12. A method of reducing hot gas flow leakage through a clearance gap between a rotating blade and a stationary shroud, said method comprising the step of:
    positioning an offset squealer inward from the outer periphery of said rotating blade so as creating a separated flow region and a flow resistance element and reduction of hot gas flow leakage therethrough.

* * * * *